United States Patent [19]

Tsubaki et al.

[11] 4,258,167
[45] Mar. 24, 1981

[54] PROCESS FOR PRODUCING POWDERY ISOTACTIC POLYOLEFIN

[75] Inventors: Kazumi Tsubaki; Noriaki Koto; Kouichi Maeda, all of Ichihara, Japan

[73] Assignee: Nissan Chemical Industries, Ltd., Tokyo, Japan

[21] Appl. No.: 6,380

[22] Filed: Jan. 25, 1979

[30] Foreign Application Priority Data

Feb. 13, 1978 [JP] Japan .................................. 53-14059
Sep. 13, 1978 [JP] Japan ................................ 53-112488

[51] Int. Cl.³ .......................... C08F 4/02; C08F 10/06
[52] U.S. Cl. ................................. 526/128; 252/429 B; 526/125; 526/127; 526/351; 526/909
[58] Field of Search ................................. 526/125, 128

[56] References Cited

U.S. PATENT DOCUMENTS

| | | | |
|---|---|---|---|
| 3,907,759 | 9/1975 | Okada et al. | 526/128 |
| 4,071,672 | 1/1978 | Kashiwa | 526/122 |
| 4,076,924 | 2/1978 | Toyota et al. | 526/125 |
| 4,085,276 | 4/1978 | Toyota et al. | 526/125 |
| 4,109,071 | 8/1978 | Berger et al. | 526/125 |
| 4,115,319 | 9/1978 | Seata et al. | 526/128 |
| 4,143,223 | 3/1979 | Toyota et al. | 526/125 |
| 4,168,361 | 9/1979 | Oda et al. | 526/125 |

FOREIGN PATENT DOCUMENTS

| | | | |
|---|---|---|---|
| 2656055 | 6/1977 | Fed. Rep. of Germany | 526/125 |
| 2701647 | 7/1977 | Fed. Rep. of Germany | 526/125 |
| 2737362 | 2/1978 | Fed. Rep. of Germany | 526/128 |
| 2743366 | 3/1978 | Fed. Rep. of Germany | 526/128 |

Primary Examiner—Edward J. Smith

Attorney, Agent, or Firm—Oblon, Fisher, Spivak, McClelland & Maier

[57] ABSTRACT

A powdery isotactic polyolefin having high isotactic characteristic and high bulk density and a narrow size distribution is produced by forming a polymerization catalyst system by reacting a Grignard reagent with a chain or cyclic hydropolysiloxane having the unit $$R_a{}^1H_b SiO_{\frac{4-a-b}{2}}$$

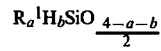

($R^1$ represents an alkyl, aryl, aralkyl, alkoxy or aryloxy group; a is 0, 1 or 2; b is 1, 2 or 3 and $a+b \leq 3$) to form a reaction product (a); reacting the reaction product (a) with at least one compound having the formula $$R^2{}_n M^{(2)} X_{z-n}$$

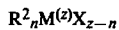

($R^2$ represents a $C_1$ to $C_{12}$ hydrocarbon moiety; M represents Al or Si; z represents atomic value of 3 or 4; X represents a halogen atom; n is 0, 1 ... (z−1)) in the presence of an aromatic hydrocarbon solvent at lower than 85° C. to form a reaction product (b); and reacting the reaction product (b) with at least one titanium halide in the presence of an organic acid ester (c) to obtain a solid catalytic component (A) and adding an organoaluminum compound (B) if necessary with an organic acid ester (C); and then, polymerizing a $C_3$ or $C_4$ olefin in the presence of a catalytic amount of the polymerization catalyst system.

16 Claims, No Drawings

PROCESS FOR PRODUCING POWDERY ISOTACTIC POLYOLEFIN

BACKGROUND OF THE INVENTION

1. Field of the Invention

The present invention relates to a process for producing a powdery isotactic polyolefin by polymerizing a $C_3$ or $C_4$ olefin in the presence of a novel catalyst system. More particularly, it relates to a process for producing a powdery isotactic polyolefin such as polypropylene having reproducible high isotactic characteristic in stable with only a small amount of the catalyst system having high catalytic activity which need not to be separated after a polymerization.

2. Description of Prior Arts

Heretofore, various proposals have been found on catalysts for producing isotactic poly-α-olefin having high stereospecific characteristic and catalysts comprising a solid titanium halide and an organoaluminum compound such as dialkylaluminum halide have been well-known.

Thus, isotactic polymers having high isotactic characteristic can be obtained by using such known catalysts however, such catalysts have not enough high catalytic activity and a step for separating a catalyst residue remained in the resulting polymer is required. In order to overcome the problem, various methods have been proposed to improve remarkably a polymer productivity per a transition metal and a solid catalytic component by depositing a transition metal compound on a carrier and to eliminate substantially a step of separating the catalyst residue.

As the conventional methods, methods of using catalysts comprising a solid catalytic component supporting a titanium compound on a magnesium halide, a trialkylaluminum and an electron donor have been disclosed in Japanese Unexamined Patent Publication Nos. 16986/1973, 16987/1973 and 16988/1973.

In accordance with the conventional methods, a catalyst activity per 1 g atom of Ti is higher than that of the catalysts comprising titanium trichloride and dialkylaluminum halide, however, a crystallinity of the resulting polymer is not so high which is not satisfactory in practical operation from the view points of economical and quality aspects.

Various proposals have been also proposed on the preparations of the solid catalytic components.

For example, in accordance with the process of Japanese Unexamined Patent Publication No. 126590/1975, it has been proposed that an anhydrous magnesium halide and an organic acid ester are mixed and pulverized for 72 hours and the pulverized mixture was treated with a titanium halide, or that an anhydrous magnesium halide and a complex of an organic acid ester are mixed and pulverized for 100 hours.

It requires a long time for preparing the solid catalytic component whereby it has not been satisfactory as a preparation of a solid catalytic component in a practical operation.

In accordance with the process of Japanese Unexamined Patent Publication No. 28189/1976, an anhydrous magnesium halide is treated with a compound having active hydrogen such as ethanol and then, treated with an organic acid ester and an organometal compound and then, reacting with a titanium halide.

According to studies by the inventors, when an anhydrous magnesium halide is contacted with ethanol etc., the reaction product is remarkably swollen to form viscous slurry whereby it is not easily treated and it is difficult to maintain a uniform reaction under stirring.

Accordingly, when the solid catalytic component obtained by the proposed method is used for a polymerization of an olefin, the resulting polymer contained large amounts of coarse particles and fine particles and a size distribution is broad.

In accordance with the proposed methods, various disadvantages such as a long time is required for preparing the solid catalytic component and a complicated reaction step is required. In the preparation of the solid catalytic component by using an inorganic compound such as magnesium halide, as a carrier, a reproducibility is low and it is difficult to obtain the solid catalytic component having an uniform quality.

The inventors have considered that these disadvantages of the conventional methods are mainly caused by the preparation of the solid catalytic component, and have studied on preparations of novel solid catalytic components and have found novel solid catalytic components for producing plymers having high isotactic characteristic. Moreover, the inventors have found that a polymerization can be carried out in stable and high reproducibility to obtain high ratio of an isotactic polymer in a high catalyst activity by using a catalyst system comprising the solid catalytic component, an organoaluminum compound and an organic acid ester at suitable molar ratio of the organoaluminum compound to Ti component in the solid catalytic component and suitable molar ratio of a total of organic acid ester remained in the solid catalytic component and the added organic acid ester to the organoaluminum compound.

SUMMARY OF THE INVENTION

It is an object of the present invention to provide for a polymerization of an α-olefin achieving a high ratio for the formation of the isotactic polymer which is stable for a long time and exhibits high reproducibility.

It is another object of the present invention to provide high polyolefin productivity per Ti component and the solid catalytic component (A) to find substantially no adverse effect of titanium halides in the polymer without an expensive step of separating a catalyst residue.

It is the other object of the present invention to provide easy molecular weight control because the catalyst system is remarkably sensitive to a small amount of a molecular weight regulator such as hydrogen and to prevent a reduction of a ratio of the formation of isotactic polymer which is found in the case of the conventional catalyst system comprising titanium trichloride and dialkylaluminum halide, and to prevent a reduction of an activity in a polymerization and to obtain various grades of polymers.

It is the other object of the present invention to provide a powdery polyolefin having uniform spherical shape and high bulk density and narrow size distribution having a small ratio of fine particles and high fluidity of a slurry of the polymer and dried polymer and easy processability.

The foregoing and other objects have been attained by providing a process for producing a powdery isotactic polyolefin which comprises forming a polymerization catalyst system by reacting a Grignard reagent with a chain or cyclic hydropolysiloxane having the unit $$R_a{}^1H_bSiO_{\frac{4-a-b}{2}}$$

($R^1$ represents an alkyl, aryl, aralkyl, alkoxy or aryloxy group; a is 0, 1 or 2; b is 1, 2 or 3 and $a+b \leq 3$); reacting the reaction product (a) with at least one compound having the formula $$R^2{}_n M^{(z)} X_{z-n}$$

($R^2$ represents a $C_1$ to $C_{12}$ hydrocarbon moiety; M represents Al or Si; z represents atomic value of 3 or 4; X represents a halogen atom; n is 0, 1 ... (z−1)) in the presence of an aromatic hydrocarbon solvent at lower than 85° C. to form a reaction product (b); and reacting the reaction product (b) with at least one titanium halide in the presence of an organic acid ester (c) to obtain a solid catalytic component (A) and adding an organoaluminum compound (B) if necessary with an organic acid ester (C) and then, polymerizing a $C_3$ or $C_4$ olefin in the presence of a catalytic amount of the polymerization catalyst system.

The catalyst system is preferably comprising the solid catalytic component (A), the organoaluminum compound (B) and the organic acid ester (C) at a molar ratio of the organoaluminum compound (B) to Ti component in the solid catalytic component (A) of (org, Al to Ti) 10 to 80 and a molar ratio of a total of the organic acid ester (c) remained in the solid catalytic component and a newly added organic acid ester (C) to the organoaluminum compound (B) (ester to org. Al) of 0.1 to 0.4.

DETAILED DESCRIPTION OF PREFERRED EMBODIMENTS

The reaction product (a) used in the present invention is soluble in an aromatic hydrocarbon solvent such as benzene, toluene, xylene and is used by dissolving it into said solvent, as a solution, in the preparation of the reaction product (b).

On the other hand, the particle size of the polymer resulted by the polymerization is highly affected depending upon the solid catalytic component (A) and the characteristic of the solid catalytic component (A) is dependent upon the characteristic of the reaction product (b). Accordingly, the particle size characteristic of the reaction product (b) is important.

In the preparation of the reaction product (b), a reaction product (a) dissolved in the aromatic hydrocarbon is used whereby the particle size characteristic of the solid catalytic component (A) is improved and the particle size characteristic of the polymer is improved to provide a powdery polymer having high bulk density and narrow size distribution (such as more than 95% of particles having 150μ to 250μ and less than 3% of particles having less than 105μ as Examples).

An yield (polymer productivity) of the polyolefin per Ti component or the solid catalytic component (A) is remarkably high whereby an expensive step of removing a catalyst residue is eliminated. This is resulted by the preparation of a reaction product (b) by dissolving the reaction product (a) in an aromatic hydrocarbon.

The catalyst system of the present invention is sensitive to a molecular weight regulator such as hydrogen, whereby a molecular weight control of the polymer is easy and a reduction of the ratio of the formation of isotactic polymer which is found in the case of the conventional catalyst system of titanium trichloride and dialkylaluminum halide, is not caused and a reduction of a catalytic activity is not caused and accordingly various grades of the polymers can be obtained.

In the preparation of the solid catalyst component (A) the solid catalytic component having uniform quality can be obtained in high reproducibility by a simple method without a step of pulverizing for a long time or a complicated step in the preparation.

When the catalyst system comprising the solid catalytic component (A) and the organoaluminum component (B) is used without an addition of the organic acid ester (C), a molar ratio of org. Al to Ti is in a range of 2 to 80 preferably 2 to 15 from the viewpoint of a desired ratio of isotactic polymer to total insoluble polymers.

It is preferable to add the organic acid ester (C) to the solid catalytic component (A) to increase a total content of the organic acid ester.

When the catalyst system comprising the solid catalytic component (A), the organoaluminum component (B) and the organic acid ester (C), is used a molar ratio of org. Al to Ti is in a range of 10 to 80 and a molar ratio of esters (the remained ester (c) and the newly added ester (C)) to org. Al is in a range of 0.1 to 0.4, whereby the polymerization can be stable in high reproducibility and the catalytic activity is higher than that of the conventional process (such as Japanese Unexamined Patent Publication No. 16986/1973) and high ratio of an isotactic polymer can be obtained.

In the preparation of the solid catalytic component (A), an aluminum compound or a silicon compound is reacted with the reaction product (a) obtained by reacting the hydropolysiloxane with the Grignard reagent and the resulting reaction product is reacted with the titanium halide in the presence of the organic acid ester (c). The preparation of the solid catalytic component is simple and the solid catalytic component having uniform quality can be easily obtained in high reproducibility and the industrial value is remarkably high.

The ratio of org. Al to Ti and the ratio of ester to org. Al are respectively selected from suitable ranges whereby high catalytic activity and high ratio of the formation of isotactic polymer can be maintained and the polymerization can be carried out in stable and high reproducibility. These effects could not be presumed and are suprising facts. In this stage, it is not fully clear the phenomenon however, it is considered that the catalytic activity and the ratio of the formation of isotactic polymer are varied depending upon the ratio of org. Al to Ti because not only the mutual function of the titanium component in the solid catalyst component (A) and the organoaluminum compound (B) but also the function of the reaction product (b) obtained by reacting aluminum and/or silicon halide with the reaction product (a) obtained from the hydropolysiloxane and the Grignard reagent, as the substrate of the solid catalytic component (A) to cause a structural variation of the solid catalytic component whereby such special characteristic phenomenon is given.

It is considered that the structural variation of the solid catalytic component (A) having a substrate of the reaction product (b) is further controlled by the addition of the organic acid ester added to give a special range of the molar ratio of ester to org. Al to impart excellent effect.

The process of the invention will be further illustrated in detail.

The solid catalytic component (A) used in the present invention can be prepared as follows.

The hydropolysiloxane used in the preparation of the reaction product (a) is chain or cyclic hydropolysiloxane having the unit $$R^1_a H_b SiO_{\frac{4-a-b}{2}}$$

($R^1$ is a monovalent organic group selected from the group consisting of alkyl, aryl, alkalkyl, alkoxy and aryloxy group; a is 0, 1 or 2; b is 1, 2 or 3 and $a+b \leq 3$) which is a compound having suitable polymerization degree or a mixture thereof and can be a low viscosity liquid having low polymerization degree to a grease or wax having high polymerization degree and a viscosity of 100,000 c.s. at 25° C. and can be solid one.

The terminal groups of the hydroxypolysiloxane do not highly affect to the activity and can be any inert group such as trialkyl silyl.

Suitable hydropolysiloxanes include tetramethyl disiloxane, diphenyl disiloxane, trimethylcyclotrisiloxane, tetramethylcyclotetrasiloxane, methylhydropolysiloxane, phenylhydropolysiloxane, ethoxyhydropolysiloxane, cyclooctylhydropolysiloxane and chlorophenylhydropolysiloxane.

The Grignard reagent used in the preparation of the reaction product (a) is a compound having the formula $$(MgR^3_2)_p \cdot (R^3MgX)_q$$

($R^3$ is a hydrocarbon moiety; X is a halogen atom; p and q are respectively 0 to 1 and $p+q=1$) or an ether complex thereof or a mixture thereof which is obtained by reacting a halogen-containing organic compound with a magnesium metal.

Suitable Grignard reagents include $R^3MgX$ (p=0 and q=1) typical Grignard reagent; dihydrocarbyl magnesium having the formula $R^3_2Mg$ (p=1; q=0) other organomagnesium halides having the formula $$(MgR^3_2)_p \cdot (R^3MgX)_q$$

and ether complexes thereof and mixtures thereof.

The Grignard reagent can be produced by the known process for example, in an ether type solvent such as diethyl ether, dibutyl ether, tetrahydrofuran, or hydrocarbon solvent such as heptane, octane, benzene and toluene in the presence of suitable amount of a chelating agent such as ethers and amines.

The reaction product (a) used in the present invention can be easily produced by reacting the hydropolysiloxane having the formula with the Grignard reagent in suitable manner.

For example, the reaction of the hydropolysiloxane with the Grignard reagent can be attained by adding dropwise the hydropolysiloxane to the Grignard reagent under stirring and heating the mixture for suitable time after the addition.

The reaction is performed at room temperature as a severe exothermic reaction. In order to complete the reaction, it is preferable to maintain the reaction mixture at 50° to 100° C. for 1 to 5 hours though the operation is not always required. A molar ratio of hydropolysiloxane to Grignard reagent is preferably 0.05 to 1:1 of $MgR^3$:Si.

The reaction product (a) in the form of the reaction mixture can be used for the preparation of the reaction product (b). When a large amount of ether of the Grignard reagent is included, a part or whole of the solvent is separated from the reaction mixture containing the reaction product (a) and an inert aromatic hydrocarbon is added to dissolve the reaction product (a) and the solution is used for the preparation of the reaction product (b). The reaction product (a) has a characteristic for dissolving in an aromatic hydrocarbon solvent such as toluene, benzene and xylene. Accordingly, in order to prepare the reaction product (b) in smooth and high reproducibility to obtain a reaction product (b) having excellent particle size characteristic, the reaction product (a) is dissolved into the aromatic hydrocarbon solvent to form a solution and it is used for the preparation of the reaction product (b).

The compound having the formula $$R^2_n M^{(z)} X_{z-n}$$

($R^2$ is a $C_1$–$C_{12}$ hydrocarbon moiety; M is Al or Si; z is a valuent of M and 3 or 4; X is a halogen atom; n is 0, 1 ... (z−1)) is a halogen-containing aluminum or silicon compound and can be various compounds depending upon combinations of $R^2$, n and z.

In the case of n=0, it is shown as $M^{(z)}X_z$ such as aluminum halides and silicon halides.

In the case of $R^2$=alkyl group, it can be alkylaluminum halides and alkylsilicon halides.

Suitable compounds include aluminum compounds such as aluminum trichloride, aluminum tribromide, aluminum triiodide, diethylaluminum chloride, diisobutylaluminum chloride, ethylaluminum sesquichloride, ethylaluminum dichloride and isobutylaluminum dichloride; and silicon compounds such as silicon tetrachloride, methyl trichlorosilane, dimethyl dichlorosilane, trimethyl monochlorosilane, ethyl trichlorosilane, butyl trichlorosilane, phenyl trichlorosilane, silicon tetrabromide.

The compounds having the formula $$R^2_n M^{(z)} X_{z-n}$$

can be used as a mixture thereof.

The reaction product (b) can be obtained by reacting the reaction product (a) with the compound having the formula $$R^2_n M^{(z)} X_{z-n}$$

or a mixture thereof.

It is necessary to use an aromatic hydrocarbon solvent such as benzene, toluene and xylene as the inert hydrocarbon solvent and to dissolve the reaction product (a) in the solvent in a form of solution whereby the reaction is smoothly performed and a uniform reaction product (b) having uniform quality is prepared in high reproducibility and accordingly a uniform solid catalytic component (A) having uniform quality is obtained and a polyolefin having excellent particle size characteristic is obtained.

They can be reacted at suitable ratio. It is preferable to react them at a molar ratio of 0.1 to 10:1 of the compound of $R^2_n M^{(z)} X_{z-n}$ to Mg component in the reaction product (a).

The reaction temperature is preferably in a range of 20 to 85° C. to give a polyolefin having excellent particle characteristics such as a bulk density and a size distribution. When it is lower than 20° C., the reaction velocity is too low, and a long reaction time is required whereas when it is higher than 85° C., the particular characteristics of the reaction product (b) are inferior whereby the practice characteristics of the polyolefin are inferior, especially a bulk density is lower.

The reaction time can be selected as desired and is usually in a range of 5 minutes to 20 hours.

The reaction product (b) can be used in the preparation of the solid catalytic component (A) in the form of the reaction mixture or after washing the reaction mixture with an inert hydrocarbon solvent such as hexane, heptane, and kerosene to separate and to recover an insoluble reaction product (b).

When an alkylaluminum halide is used in the preparation of the reaction product (b), a content of a transition metal in the solid catalytic component is remarkably increased in the preparation of the solid catalytic component (A) and a catalyst having high catalytic activity may not be obtained or a ratio of the formation of isotactic polymer may be low and accordingly it is preferable to separate the reaction product (b) as the latter process.

Titanium halide used for the reaction with the reaction product (b) in the presence of the organic acid ester (c) is a compound having the formula $$TiX_m(OR^4)_{4-m}$$

(X is a halogen atom; $R^4$ is a $C_1-C_8$ hydrocarbon moiety; m is 1 to 4).

Suitable titanium halides include $TiCl_4$, $TiBr_4$, $Ti(OC_2H_5)Cl_3$, $Ti(OC_4H_9)Cl_3$, $Ti(OC_2H_5)_2Cl_2$, $Ti(OC_3H_7)_2Cl_2$ and $Ti(OC_4H_9)_2Cl_2$.

The reaction of the reaction product (b) with the titanium halide can be carried out in the presence or absence of an inert hydrocarbon solvent.

They can be reacted at suitable molar ratio preferably 0.1 to 150 mole of the titanium halide per 1 mole of Mg in the reaction product (b).

The organic acid ester used in the reaction of the reaction product (b) with a titanium halide, can be aliphatic carboxylic acid esters, aromatic carboxylic acid esters and alicyclic carboxylic acid esters.

It is preferable to use the aromatic carboxylic acid esters such as methyl benzoate, ethyl benzoate, methyl toluate, ethyl toluate, methyl anisate, and ethyl anisate.

An amount of the organic acid ester (c) is in a range of 0.1 to 20 mole preferably 0.5 to 5 mole per 1 mole of Mg in the reaction product (b).

The organic acid ester (c) can be added by one of the following methods.

(1) In the preparation of the reaction product (b), it is added together with the reaction product (a) and the compound of $R^2{}_nM^{(z)}X_{z-n}$.

(2) It is mixed with the reaction product (b) before reacting the reaction product (b) with the titanium halide.

(3) It is added simultaneously when adding the titanium halide to the reaction product (b) for the reaction.

(4) It is added after adding the titanium halide to the reaction product (b).

The reaction temperature and the reaction time in the reaction of the reaction product (b) with the titanium halide in the presence of an organic acid ester (c) are not limited and are usually at 50° to 150° C. for 30 minutes to 20 hours.

Thus, the solid catalytic component (A) is produced and is recovered by washing the reaction mixture with an inert hydrocarbon solvent such as hexane, heptane and kerosene to remove the soluble components.

The resulting solid catalytic component (A) is used together with the organoaluminum compound (B) and if necessary, the organic acid ester (C) as a catalyst for a polymerization of an olefin.

When the ratio of org. Al to Ti and the ratio of ester to org. Al are respectively in the specific ranges defined, the catalyst having high catalytic activity which produce the isotactic polymer having high isotactic degree can be obtained.

If necessary, the solid catalytic component (A) or the reaction mixture is treated with the titanium halide and washed with an inert hydrocarbon solvent and the resulting solid catalytic component can be used.

This process is effective to maintain high level of isotactic degree and high catalytic activity.

The resulting solid catalytic component (A) usually contains 0.5 to 10 wt.% of Ti component and a molar ratio of the organic acid ester (c) in the solid catalytic component to Ti is in a range of 0.6 to 4.0.

The solid catalytic component (A) can be used after drying it under a reduced pressure or dispersing it in an inert solvent, in the preparation of the polymerization catalyst system.

The organoaluminum compound (B) used in the present invention is a compound having the formula $$AlR^5{}_lX_{3-l}$$

($R^5$ is a $C_1-C_8$ hydrocarbon moiety; X is a halogen or hydrogen atom or an alkoxy group; l is 1, 2 or 3).

Suitable organoaluminum compounds (B) include trimethylaluminum, triethylaluminum, tributylaluminum, diethylaluminum chloride, dibutylaluminum chloride, ethylaluminum sesquichloride, diethylaluminum hydride, dibutylaluminum hydride and diethylaluminum ethoxide. One or more organoaluminum compounds can be used.

The organic acid esters (C) can be aliphatic carboxylic acid esters, aromatic carboxylic acid esters and alicyclic carboxylic acid esters. It is preferable to use an aromatic carboxylic acid esters such as methyl benzoate, ethyl benzoate, methyl toluate, ethyl toluate, methyl anisate and ethyl anisate.

The organic acid ester (C) can be the same with or different from the organic acid ester (c) used in the preparation of the solid catalytic component (A).

The catalyst system for the polymerization of an olefin can be prepared by contacting the solid catalytic component (A), the organoaluminum compound (B) and the organic acid ester (C) in the presence or absence of the inert hydrocarbon solvent. The method of contacting the three components is not limited. For example, the three components are simultaneously charged in a vessel for a preparation of the catalyst or in a reactor for a polymerization which contain a solvent, and they are stirred to prepare the catalyst system.

The ratios of the three components suitable for the preparation of the catalyst system for a polymerization of an olefin is the most important in the present invention.

The object of the present invention is attained by combining them, at a molar ratio of the organoaluminum to Ti component (ratio of org. Al to Ti) in the solid catalytic component (A) and at a molar ratio of a total of organic acid ester (c) remained in the solid catalytic component (A) and newly added organic acid ester (C)

to the organoaluminum compound (B) (ratio of ester to org. Al) of 0.1 to 0.4.

When the molar ratio of org. Al to Ti is less than 10, it is difficult to perform a polymerization in stable and high reproducibility. When the molar ratio of org. Al to Ti is more than 80, the ratio of the formation of the isotactic polymer is reduced. In such case, the productivity of the polymerization solvent soluble polymer can be reduced by increasing the amount of the organic acid ester (C), however, the extraction residue percent of the insoluble polymer in boiled n-heptane is reduced and accordingly, the ratio of the formation of the isotactic polymer is reduced and the catalytic activity is highly reduced, disadvantageously.

When the molar ratio of ester to org. Al (B) is less than 0.1, the effect of the organic acid ester is not enough and the ratio of the formation of the isotactic polymer is reduced and a large amount of rubber-like amorphous polymer which has less value is produced. When the molar ratio of ester to org. Al (B) is higher than 0.4, the ratio of the formation of the isotactic polymer is increased however, the catalytic activity is highly reduced.

The amount of the solid catalytic component (A) is dependent upon the content of the titanium component in the solid catalytic component (A). In the case of a polymerization of olefin in the inert hydrocarbon solvent, the amount of the solid catalytic component (A) is in a range of 0.1 to 5 mg preferably 0.2 to 2.0 mg as Ti per 1 liter of the solvent.

The amount of the organoaluminum compound (B) is dependent upon the Ti content and the amount of the solid catalytic component (A) and especially in the molar ratio defined above.

In the case of a polymerization in an inert hydrocarbon solvent, the amount of the organoaluminum compound (B) is more than 0.1 m mole preferably 0.3 to 5 m mole.

The amount of the organic acid ester (C) is dependent upon the content of the organic acid ester (c) remained in the solid catalytic component (A) and the amount of the solid catalytic component (A) and the amount of the organoaluminum compound (B) and especially in the molar ratio defined above.

The amounts of the solid catalytic component (A), the organoaluminum compound (B) and the organic acid ester (C) are selected. When the catalyst system is prepared in the reactor, the catalyst system is prepared by using these components and then, the olefin is fed in the reactor. When the catalyst system is prepared in the other vessel, the suspension of the catalyst system is charged in the reactor and the olefin is fed in the reactor to attain the polymerization of the olefin easily.

The polymerization of the α-olefin of the present invention can be carried out as those of the conventional polymerization of olefin in the presence of Ziegler Natta catalyst. The polymerization is carried out in the substantial absence of oxygen and water. The polymerization can be a suspension polymerization in the inert solvent or non-solvent polymerization in the monomer solvent or a gaseous phase polymerization in a batch system or a continuous system.

The polymerization temperature is in a range of 30° to 200° C. especially 60° to 100° C. and the polymerization pressure is in a range of 5 to 50 kg/cm$^2$.

The molecular weight of the polymer obtained by the process of the present invention is dependent upon the polymerization temperature and the amount of the catalyst and especially it is effectively controlled by adding hydrogen in the polymerization system.

The olefins used for the polymerization can be various olefins which can be polymerized to form isotactic polymers and especially $C_3$- or $C_4$- olefins such as propylene and 1-butene. A small amount of a comonomer such as ethylene can be incorporated.

As described above, the catalytic activity of the catalyst system is remarkably high whereby the amount of the catalyst residue in the polyolefin is quite small. Accordingly, there is no adversal effect of the catalyst residue to the quality of the polyolefin. Even though the polyolefin is fabricated without separating the catalyst residue, a product having excellent hue and strength can be obtained, advantageously and the industrial value is remarkably high.

The following non-limiting examples will serve to illustrate the present invention.

In the examples, the term of an extraction residue percent of an insoluble polymer in a boiled n-heptane means a ratio of isotactic polymer to total insoluble polymers.

EXAMPLE 1

(a) Preparation of Reaction product (a) obtained by reacting hydropolysiloxane

In a glass reactor dried and purged with nitrogen, 75 ml of a solution of n-butylmagnesium chloride in tetrahydrofuran (0.167 mole of n-butylmagnesium chloride) was sampled and 10.5 ml of methylhydropolysiloxane having terminal trimethylsilyl groups (viscosity of about 30 c.s. at 25° C.) (0.175 mole as Si) was gradually added dropwise. Because of exothermic reaction, a reactor was cooled with a collant to control at lower than 70° C. After the addition, the reactor was kept at 70° C. for 1 hour and then, it was cooled to room temperature to obtain dark brown transparent solution. A part of the solution was sampled and the presence of the unreacted n-butylmagnesium chloride was examined by the Gilman method (J. Am. Chem. Soc. 47, 2002 (1925)). No unreacted n-butylmagnesium chloride was detected. The solution was kept at 50° C. and the solvent was distilled off under a reduced pressure to obtain 38.6 g of white solid reaction product (a). The white solid contained 0.44 mole of tetrahydrofuran per Mg atom. (a hydrolyzed product is analyzed by gas chromatography).

(b) Preparation of Reaction product (b)

In a glass reactor dried and purged with nitrogen, 12.5 g of a white solid reaction product (a) was sampled and dissolved in 200 ml of toluene, and then 20.4 g of $SiCl_4$ was added dropwise at 44° to 60° C. for 1.5 hours and then, the reaction was carried out at the same temperature for 1.5 hours. After the reaction, the solid component was separated and washed for 4 times with 500 ml of n-hexane by each decantation-filtration. Then, the solid component was dried under a reduced pressure to obtain 7.2 g of white reaction product. The reaction product (b) contained 171 mg (7.03 m mole) of magnesium content, 402 mg (5.74 m mole) of chlorine content and 111 mg. (3.95 m mole) of silicon content per 1 g.

(c) Preparation of solid catalytic component (A)

In a glass reactor dried and purged with nitrogen, 5.5 g of the white reaction product (b) was sampled and then, 50 ml of n-hexane was added to suspend the reaction product (b) and then, 208 g of TiCl$_4$ was added and the reaction was carried out for 1 hour under refluxing it. Then, 10 ml of a solution of 5.8 g of ethyl benzoate in n-hexane was added and the reaction was carried out for 2 hours under refluxing it. After the reaction, the solid component was separated and washed for 4 times with 500 ml of n-hexane by each decantation-filtration and then, dried at 50° C. under a reduced pressure to obtain 4.6 g of solid catalytic component (A). The solid catalytic component (A) contained 24.9 mg (0.520 m mole) of titanium content and 167.1 mg (1.113 m mode) of ethyl benzoate content.

(d) Polymerization

In 1.2 liter of stainless steel autoclave equipped with a stirrer and a jacket for heating and cooling and dried and purged with nitrogen, 600 ml of a purified n-hexane, 0.3 m mole of triethylaluminum and 48.1 mg of the solid catalytic component A (0.025 m mole as Ti) were sequentially charged (mole ratio of organoaluminum compound to Ti at a polymerization is 12 and Ratio of organic acid ester to organoaluminum of 0.18). Then, the polymerization system was heated to 70° C. and propylene was charged to a total pressure of 7.0 Kg/cm$^2$ to initiate the polymerization. The temperature and the pressure were kept in constant, and a polymerization was carried out for 1 hour and a polymerization was stopped and cooled to room temperature and the unreacted propylene was purged. The polymer was separated by a glass filter and dried at 50° C. for 5 hours under a reduced pressure to obtain 234.4 g of white powdery polypropylene which had a bulk density of 0.37 g/Ml, a size distribution of more than 95% of particles having 150μ to 250μ and 2.1% of fine particles of less than 105μ and an average size of 184μ.

On the other hand, a polymerization solvent soluble polymer recovered from the polymerization solution was 12.1 g and a ratio of a polymerization solvent insoluble polymer to a total polymer was 95.1% and an extraction residue percent of the insoluble polymer in a boiled n-heptane was 95.1%.

A polymer productivity of the catalyst was 205.4 Kg/g Ti hr.

EXAMPLE 2

(d) Polymerization

In accordance with the process of Example 1 except using 57.6 mg (0.03 m mole as Ti) of the solid catalytic component (A) obtained by Example 1 and 0.18 m mole of triethylaluminum, a polymerization of propylene was carried out. (Ratio of organoaluminum compound of Ti of 6) to obtain 193.1 g of white powdery polypropylene which had a bulk density of 0.37 g/ml, a size distribution of more than 95% of particles having 150μ to 250μ and 1.8% of fine particles of less than 105μ. A 2.0 g of a polymerization solvent soluble polymer recovered from the polymerization solution and a ratio of a polymerization insoluble polymer to the total polymer was 99.0% and an extraction residue percent of a polymerization solvent insoluble polymer in a boiled n-heptane was 95.8%. A polymer productivity of the catalyst was 135.8 Kg/g Ti hr.

EXAMPLE 3

(b) Preparation of Reaction product (b)

In a glass reactor dried and purged with nitrogen, 11.1 g of AlCl$_3$ was charged and dispersed in 300 ml of toluene and then, 12.5 g of ethyl benzoate was added and 105 ml of a solution of 17.3 g of the reaction product (a) obtained in Example 1 in toluene was added dropwise at 37° to 41° C. for 4.5 hours. After the addition, the reaction was carried out at the same temperature for 2 hours and then, it was heated at 83° to 85° C. and the reaction was further carried out for 1 hour. The reaction mixture was used for the preparation of the solid catalytic component (A).

(c) Preparation of Solid catalytic component (A)

The reaction mixture was kept in a stand-still to precipitate the resulting white reaction product (b) and 250 ml of a supernatant was removed and 433 g of TiCl$_4$ was added and the reaction was carried out for 2 hours under a refluxing. After the reaction, the solid phase was separated and washed for 5 times with 500 ml of n-hexane by each decantation-filtration. After drying under a reduced pressure, 9.7 g of a solid catalytic component (A) was obtained. The solid catalytic component contained 10.7 mg (0.223 m mole) of Ti content, 119.6 mg (0.796 m mole) of ethyl benzoate content per 1 g.

(d) Polymerization

In accordance with the process of Example 1 except using 0.3 m mole of triethylaluminum and 111.9 mg (0.025 m mole as Ti) of the solid catalytic component (A), and reacting for 30 minutes, the polymerization of propylene was carried out (Ratio of organoaluminum compound of Ti of 12 and Ratio of organic acid ester to organoaluminum of 0.30) to obtain 195 g of white powdery polypropylene which had a bulk density of 0.34 g/ml and a size distribution of more than 95% of particles having 150μ to 250μ and 1.6% of fine particles of less than 105μ, and an average particle size of 204μ.

On the other hand, a polymerization solvent soluble polymer recovered from a polymerization solvent was 5.9 g and a ratio of the polymerization solvent insoluble polymer to a total polymer was 97% and an extraction residue percent of the polymerization solvent insoluble polymer in a boiled n-heptane was 94.8%. A polymer productivity of the catalyst was 167.4 Kg/g Ti 0.5 hr.

EXAMPLE 4

(d) Polymerization

In accordance with the process of Example 1 except using 134.3 mg of the solid catalytic component (A) and 0.18 m mole of triethylaluminum, a polymerization of propylene was carried out (Ratio of organoaluminum compound to Ti of 6.0) to obtain 228.4 g of a polymerization solvent insoluble white powdery polypropylene which had a bulk density of 0.34 g/ml, a size distribution of more than 95% of particles having 175μ to 250μ and an average particle size of 210μ.

On the other hand, a polymerization solvent soluble polymer recovered from the polymerization solution was 2.5 g and a ratio of a polymerization solvent insoluble polymer to a total polymer was 98.9% and an extraction residue percent of the insoluble polymer in a boiled n-heptane was 96.2%.

A polymer productivity of the catalyst was 160.7 Kg/g Ti hr.

REFERENCE 1

(c) Preparation of Solid catalytic component

A suspension of 3.4 g of the reaction product (b) obtained by Example 1-(b) was suspended in 40 ml of n-hexane and 104 g of $TiCl_4$ was added and the reaction was carried out for 3 hours under refluxing it and the product was washed and dried by the process of Example 1-(c) to obtain 2.7 g of a solid catalytic component having 47.0 mg of Ti content per 1 g.

(d) Polymerization

In accordance with the process of Example 1 except using 0.3 m mole of triethylaluminum and 25.5 mg (0.025 m mole as Ti) of the solid catalytic component (Ratio of organoaluminum to Ti of 12.0) a polymerization of propylene was carried out to obtain 59.0 g of white powdery polypropylene.

On the other hand, a polymerization solvent soluble polymer recovered from the polymerization solution was 67.1 g and a ratio of a polymerization solvent insoluble polymer to a total polymer was 46.8% and an extraction residue percent of the insoluble polymer in a boiled n-heptane was 60.2%. A polymer productivity of the catalyst was 105.1 Kg/g Ti hr.

The polymer obtained by the process of Reference 1 was pasty and a separation of the insoluble polymer from the soluble polymer by a glass filter was not easy.

From the result, the catalytic efficiency was remarkably high however, a ratio of isotactic polymer to a total polymer was remarkably low.

REFERENCE 2

Ethyl benzoate treatment of Reaction product obtained by reacting Reaction product (b) with $TiCl_4$ A suspension of 1.1 g of a solid catalytic component obtained by Reference 1 (Reaction product obtained by reacting Reaction product (b) with $TiCl_4$) in 50 ml of n-heptane was prepared and 22 ml of a solution of 1 mole/liter of ethyl benzoate in n-heptane (2 mole per Ti) was added dropwise and the mixture was heated at 80° C. for 1 hour. After the treatment, the solid phase was separated and washed for 5 times with 300 ml of n-hexane by each decantation-filtration and dried at 50° C. under a reduced pressure to obtain 1.0 g of a solid catalytic component.

The solid catalytic component contained 26.8 mg (0.559 m mole) of Ti content, 188.0 mg (1.252 m mole) of ethyl benzoate content.

(e) Polymerization

In accordance with the process of Example 1 except using 0.3 m mole of triethylaluminum and 44.8 mg (0.025 m mole of Ti) of the solid catalytic component (A), (Ratio of organoaluminum to Ti of 12.0 and Ratio of organic acid ester to organoaluminum of 0.19), a polymerization of propylene was carried out to obtain 58.3 g of white powdery polypropylene which had a bulk density of 0.33 g/ml.

On the other hand, a polymerization solvent soluble polymer recovered from the polymerization solution was 6.1 g and a ratio of a polymerization solvent insoluble polymer to a total polymer was 90.6% and an extraction residue of the polymerization solvent insoluble polymer in a boiled n-heptane was 94.8%.

A polymer productivity of the catalyst was 53.7 Kg/g Ti hr.

REFERENCE 3

(b) Preparation of Reaction product (b)

In a glass reactor dried and purged with nitrogen, 12.5 g of the reaction product (a) obtained by Example 1-(a) was charged and dispersed in 200 ml of n-heptane and 20.4 g of $SiCl_4$ was added dropwise at 45° to 60° C. for 1.5 hours. After the addition, the reaction was carried out at the same temperature for 1.5 hours. After the reaction, the solid phase was separated and washed for 8 times with 500 ml of n-hexane by each decantation-filtration and dried at 50° C. under a reduced pressure to obtain 6.5 g of white reaction product (b).

(c) Preparation of Solid catalytic component (A)

In a glass reactor dried and purged with nitrogen, 5.0 g of the reaction product (b) was charged and 50 ml of n-hexane was added to suspend the reaction product (b) and then, 208 g of $TiCl_4$ was added and the reaction was carried out for 1 hour under refluxing. Then, 10 ml of a solution of 5.4 g of ethyl benzoate in n-hexane was added to the reaction mixture and the reaction was further carried out for 2 hours under refluxing. After the reaction, the solid phase was separated and washed for 4 times with 500 ml of n-hexane by each decantation-filtration and dried under a reduced pressure to obtain 4.6 g of a solid catalytic component (A). The solid catalytic component (A) contained 17.6 mg (0.367 m mole) of Ti content and 113.0 mg (0.752 m mole) of ethyl benzoate per 1 g.

(d) Polymerization

In accordance with the process of Example 1 except using 0.3 m mole of triethylaluminum and 68.2 mg (0.025 m mole as Ti) of the solid catalytic component, (Ratio of organoaluminum to Ti of 12.0 and Ratio of organic acid ester to organoaluminum of 0.17), a polymerization of propylene was carried out to obtain 145.3 g of white powdery polypropylene, which had a bulk density of 0.25 g/ml (remarkably lower than that of Example 1) and a size distribution of 67% of particles having 105μ to 250μ and 28% of fine particles having less than 105μ and an average size of 125μ.

On the other hand, a polymerization solvent soluble polymer recovered from the polymerization solution was 9.3 g and a ratio of a polymerization solvent insoluble polymer to a total polymer was 94.0% and an extraction residue of the polymerization solvent insoluble polymer in a boiled n-heptane was 94.2%.

A polymer productivity of the catalyst was 128.8 Kg/g Ti hr.

REFERENCE 4

(b) Preparation of Reaction product (b)

In a glass reactor dried and purged with nitrogen, 4.2 g of the white solid reaction product (a) obtained by Example 1-(a) was charged and dissolved in 30 ml of toluene and then 3.0 g of ethyl benzoate was added and 20 ml of a solution of 6.8 g of $SiCl_4$ in n-heptane was added dropwise at 70° to 80° C. for 30 minutes. After the addition, the reaction was carried out at 100° C. for 2 hours. After the reaction, the reaction mixture was cooled and used for the preparation of a solid catalytic component (A).

(c) Preparation of Solid catalytic component (A)

Into the reaction mixture containing the reaction product (b), 173 g of TiCl$_4$ was added and the reaction was carried out for 2 hours under refluxing with stirring. After the reaction, the solid phase was separated and washed for 7 times with 200 ml of n-hexane by each decantation-filtration and dried under a reduced pressure to obtain 1.5 g of a solid catalytic component (A). The solid catalytic component had 20.8 mg (0.434 m mole) of Ti component and 123.3 mg (0.821 m mole) of ethyl benzoate content per 1 g.

(d) Polymerization

In accordance with the process of Example 1 except using 0.3 m mole of triethylaluminum and 57.8 mg (0.025 m mole as Ti) of the solid catalytic component (A), (Ratio of organoaluminum to Ti of 12 and Ratio of organic acid ester to organoaluminum of 0.16), a polymerization of propylene was carried out to obtain 121.0 g of white powdery polypropylene which had a bulk density of 0.23 g/ml (remarkably lower than that of Example 1) and a size distribution of 75% of particles having 105$\mu$ to 210$\mu$ and 22% of fine particles of less than 105$\mu$ and an average size of 142$\mu$.

On the other hand, a polymerization solvent soluble polymer recovered from the polymerization solution was 5.2 g and a ratio of a polymerization solvent insoluble polymer to a total polymer was 95.9% and an extraction residue of the polymerization solvent insoluble polymer in a boiled n-heptane was 92.2%.

A polymer productivity of the catalyst was 105.2 Kg/g Ti hr.

EXAMPLE 5

(d) Polymerization

In accordance with the process of Example 1 except using 0.3 m mole of triethylaluminum, 0.04 m mole of ethyl benzoate (0.1 mole/liter of n-heptane) 16.0 mg (0.00835 m mole as Ti) of the solid catalytic component (A) obtained by Example 1, (Ratio of organoaluminum to Ti of 36 and Ratio of organic acid ester to organoaluminum of 0.19), a polymerization of propylene was carried out to obtain 72.6 g of a polymerization solvent insoluble white powdery polymer which had a bulk density of 0.37 g/ml; a size distribution of more than 95% of particles having 150$\mu$ to 210$\mu$ and 1.7% of fine particles having less than 105$\mu$ and an average size of 172$\mu$.

On the other hand, a polymerization solvent soluble polymer recovered from the polymerization solution was 0.7 g and a ratio of a polymerization solvent insoluble polymer to a total polymer was 99.1% and and extraction residue of the polymerization solvent insoluble polymer in a boiled n-heptane was 96.0%.

A polymer productivity of the catalyst was 183.2 Kg/g hr.

EXAMPLES 6 to 7

(d) Polymerization

In accordance with the process of Example 1 except using 57.6 mg or 19.2 mg (0.03 m mole or 0.01 m mole as Ti) of the solid catalytic component (A) obtained by Example 1 and 0.3 m mole or 0.8 m mole of organoaluminum and 0.01 m mole or 0.16 m mole of ethyl benzoate, (Ratio of organoaluminum to Ti of 10 or 80; Ratio of organic acid ester to organoaluminum of 0.25 and 0.23) to obtain 254.0 g and 69.0 g of white powdery polypropylene which respectively had bulk densities of 0.38 g/ml and 0.37 g/ml and size distributions of more than 95% of particles having 150$\mu$ to 210$\mu$ and 1.6% and 1.7% of fine particles having less than 105$\mu$ and average sizes of 178$\mu$ and 174$\mu$.

On the other hand, polymerization solvent soluble polymers recovered from the polymerization solutions were respectively 1.8 g and 0.7 g and ratios of the polymerization solvent insoluble polymer to the total polymer were respectively 99.3% and 99.0% and extraction residue percents of the polymerization solvent insoluble polymers in a boiled n-heptane were 96.7% and 95.8%.

Polymerization productivity percentages were respectively 178.0 Kg/g Ti hr. and 145.6 Kg/g Ti hr.

REFERENCES 5 to 10

(d) Polymerization

In accordance with the process of Example 1 except using the solid catalytic component (A) obtained by Example 1 triethylaluminum and ethyl benzoate at the amounts shown in Table 1, each polymerization of propylene was carried out. The results are shown in Table 2.

TABLE 1

| Reference No. | 5 | 6 | 7 | 8 | 9 | 10 |
|---|---|---|---|---|---|---|
| Amount of Al(C$_2$H$_5$)$_3$ (m mole) | 1.0 | 1.0 | 1.5 | 1.5 | 1.5 | 0.3 |
| Amount of ethyl benzoate (m mole) | 0.21 | 0.26 | 0.30 | 0.40 | 0.01 | 0.32 |
| Amount of solid catalytic component (mg) | 19.2 | 19.2 | 16.0 | 16.0 | 16.0 | 19.2 |
| Ti content in solid catalytic component (A) (m mole) | 0.01 | 0.01 | 0.00835 | 0.00835 | 0.00835 | 0.01 |
| Molar ratio of Al(C$_2$H$_5$)$_3$: Ti in polymerization | 100 | 100 | 180 | 180 | 36 | 80 |
| Molar ratio of ethyl benzoate: Al(C$_2$H$_5$)$_3$*(1) | 0.23 | 0.28 | 0.21 | 0.28 | 0.09 | 0.43 |

*(1)Ethyl benzoate: a total of a remained ethyl benzoate in solid component and an added ethyl benzoate.

TABLE 2

| Reference No. | 5 | 6 | 7 | 8 | 9 | 10 |
|---|---|---|---|---|---|---|
| Yield of insoluble polymer (g) (A) | 68.8 | 46.0 | 48.6 | 32.2 | 84.7 | 20.1 |
| Yield of soluble polymer (g) (B) | 0.6 | 0.5 | 0.6 | 0.3 | 1.2 | 0.1 |
| (A)/(A) + (B) × 100 (%) | 99.1 | 98.9 | 99.1 | 99.2 | 88.3 | 99.5 |
| Extraction residue percent of insoluble polymer in boiled n-heptane (%) | 92.7 | 95.7 | 90.7 | 95.0 | 85.5 | 97.5 |
| Polymer productivity (Kg pp/g Ti hr)*1 | 144.8 | 97.0 | 122.5 | 81.3 | 239.8 | 42.2 |
| Bulk density (g/ml) | 0.37 | 0.36 | 0.37 | 0.36 | 0.36 | 0.34 |
| Size distribution | | | | | | |
| 105 $\mu$ > | 1.8 | 2.0 | 1.8 | 2.4 | 2.0 | 2.8 |
| 250 $\mu$ < | 2.9 | 2.5 | 3.0 | 2.2 | 3.0 | 1.9 |

*1Polymer productivity (catalyst activity) : production of polypropylene per Ti atom × hour As it is clear from Tables 1 and 2, when a molar ratio of organoaluminum to Ti is more than 100, an extraction residue percent of insoluble polymer in boiled n-heptane is reduced though a ratio of insoluble polymer to total polymer is not changed. This fact shows a reduction of a ratio of isotactic polymer to total polymer. When a molar ratio of organoaluminum to Ti is high as 180, a ratio of isotactic polymer to total polymer is reduced and a catalyst activity (polymer productivity) is also reduced. When an amount of organic acid ester is increased to increase a ratio of isotactic polymer to total polymer, a catalyst activity is remarkably reduced.

As it is clear from the results of References 9 and 10, when a molar ratio of organic acid ester to organoaluminum is out of suitable range even though a molar ratio of organoaluminum to Ti is kept in suitable range, a catalyst activity is enough high, but a ratio of isotactic polymer to total polymer is remarkably reduced or a ratio of isotactic polymer to total polymer is enough high but a catalyst activity is too low.

EXAMPLES 8 to 10

(d) Polymerization

In accordance with the process of Example 1 except using the solid catalytic component (A) obtained by Example 3, and using 0.3, 0.8 or 0.3 m mole of triethylaluminum; 0.04, 0.18 or 0.007 m mole of ethyl benzoate; and 37.4, 44.8 or 111.9 mg (0.00835, 0.01 or 0.025 m mole as Ti) of the solid catalytic component (A) respectively, (Ratio of organoaluminum to Ti of 36, 80 or 12; Ratio of organic acid ester to organoaluminum of 0.23, 0.27 or 0.32) each polymerization of propylene was carried out to obtain 88.3 g, 123.5 g or 197.4 g of white powdery polypropylene which respectively had a bulk density of 0.34 g/ml, 0.35 g/ml or 0.34 g/ml and a size distribution of more than 95% of particles having 175 to 250$\mu$ and less than 2% of fine particles having less than 105$\mu$ and average size of 210$\mu$, 214$\mu$ or 204$\mu$, respectively.

On the other hand, polymerization solvent soluble polymers recovered from polymerization solutions were respectively 0.7 g, 1.5 g or 1.6 g and ratio of polymerization solvent soluble polymers to total polymer were respectively 99.2%, 98.8% or 99.2% and extraction residue percents of insoluble polymers in boiled n-heptane were respectively 96.6%, 95.5% or 97.0%.

Polymer productivities were respectively 222.5 Kg/g Ti hr., 260.9 Kg/g Ti hr. or 165.8 Kg/g Ti hr.

REFERENCES 11 to 13

(d) Polymerization

In accordance with the process of Example 1 except using 44.8 mg (0.01 m mole as Ti) of the solid catalytic component (A) obtained by Example 3, and 0.8, 0.8 or 1.2 m mole of triethylaluminum and 0.33, 0.03 or 0.29 m mole of ethyl benzoate respectively, (Ratio of organoaluminum to Ti of 80, 80 or 120; Ratio of organic acid ester to organoaluminum of 0.46, 0.08 or 0.27), each polymerization of propylene was carried out to obtain 33.1 g, 151.9 g or 107.9 g of white powdery polypropylene which respectively had a bulk density of 0.32 g/ml, 0.35 g/ml or 0.35 g/ml and a size distribution of more than 95% of particles having 175 to 250$\mu$ and less than 2% of fine particles having less than 105$\mu$.

On the other hand, polymerization solvent soluble polymers recovered from polymerization solutions were respectively 0.2 g, 27.2 g and 1.4 g and ratios of polymerization solvent soluble polymer to total polymer were respectively 99.2%, 84.8% and 98.7%, and extraction residue percents of insoluble polymers in boiled n-heptane were respectively 97.2%, 86.6% and 91.5%.

Polymer productivities were respectively 69.6 Kg/g Ti hr., 373 Kg/g Ti hr. or 228.1 Kg/g Ti hr.

As it is clear from the results, when a molar ratio of organic acid ester to organoaluminum is out of suitable range or a molar ratio of organoaluminum to Ti is out of suitable range, a catalyst activity (polymer productivity) is remarkably reduced or a ratio of isotactic polymer to total polymer is remarkably reduced as similar to the results of References 5 to 10.

EXAMPLE 11

(b) Preparation of reaction product (b)

In a glass reactor dried and purged with nitrogen, 20.8 g of the reaction product (a) obtained by Example 1-a) was charged and dissolved in 200 ml of toluene and 30.0 g of ethyl benzoate was added and then, 80 ml of solution of 34.0 g of SiCl$_4$ in toluene was added dropwise at 55 to 60° C. for 3 hours and the reaction was carried out at the same temperature for 2 hours. After the reaction, it was cooled and used for the following preparation of a solid catalytic component (A).

(c) Preparation of solid catalytic component (A)

Into the white reaction mixture, containing the reaction product (b), 259 g of TiCl$_4$ was added and the reaction was carried out for 2 hours under refluxing with stirring. After the reaction, a solid phase was separated and washed for 4 times with 500 ml of n-hexane by a decantation-filtration and dried under a reduced pressure to obtain 8.2 g of the solid catalytic component (A), which contained 19.8 mg (0.413 m mole) of Ti component and 105.0 mg (0.699 m mole) of ethyl benzoate content.

(d) Polymerization

In accordance with the process of Example 1 except using 0.3 m mole of triethylaluminum, 0.04 m mole of ethyl benzoate and 20.2 mg (0.00835 m mole as Ti) of the solid catalytic component (A), (Ratio of organoaluminum to Ti of 36; Ratio of organic acid ester to organoaluminum of 0.18) a polymerization was carried out to obtain 53.5 g of white powdery polypropylene which had a bulk density of 0.37 g/ml and a size distribution of more than 95% of particles having 150$\mu$ to 210$\mu$ and 1.5% of fine particles having less than 105$\mu$ and an average size of 182$\mu$.

On the other hand, a polymerization solvent soluble polymer recovered from the polymerization solution was 0.3 g and a ratio of polymerization solvent insoluble polymer to total polymer was 99.4% and an extraction residue percent of the insoluble polymer in boiled n-heptane was 97.0%.

A polymer productivity of the catalyst was 134.5 Kg/g Ti hr.

EXAMPLE 12

(d) Polymerization

In accordance with the process of Example 11-(d) except using the solid catalytic component (A) obtained by Example 11, and using 0.3 m mole of triisobutylaluminum instead of triethylaluminum, (Ratio of organoaluminum to Ti of 36; Ratio of organic acid ester to organoaluminum of 0.18), a polymerization of propylene was carried out to obtain 49.5 g of white powdery polypropylene which had a bulk density of 0.36 g/ml and a size distribution of more than 95% of particles having 150μ to 210μ and 1.8% of fine particles having less than 105μ and an average size of 185μ.

On the other hand, a polymerization solvent soluble polymer recovered from the polymer solution was 0.3 g and a ratio of a polymerization solution insoluble polymer to total polymer was 99.3% and an extraction residue percent of the insoluble polymer in boiled n-heptane was 96.9%.

A polymer productivity of the catalyst was 124.5 Kg/g Ti hr.

EXAMPLE 13

(c) Treatment of Solid catalytic component (A) with TiCl$_4$

In a glass reactor dried and purged with nitrogen, 3.2 g of the solid catalytic component (A) obtained by Example 11 was charged and 30 ml of n-hexane was added to suspend it and then, 104 g of TiCl$_4$ was added and the mixture was stirred for 2 hours under refluxing. After the treatment, the solid phase was separated and washed for 4 times with 300 ml of n-hexane by each decantation-filtration and dried under a reduced pressure to obtain 3.1 g of a solid catalytic component treated with TiCl$_4$ which contained 21.7 mg (0.453 m mole) of Ti component and 68.7 mg (0.457 m mole) of ethyl benzoate.

(d) Polymerization

In accordance with the process of Example 1 except using 0.3 m mole of triethylaluminum, 0.05 m mole of ethyl benzoate and 18.4 mg (0.00835 m mole as Ti) of TiCl$_4$ in the solid catalytic component (A), (Ratio of organoaluminum to Ti of 36; Ratio of organic acid ester to organoaluminum of 0.19), a polymerization of propylene was carried out to obtain 94.0 g of white powdery polypropylene which had a bulk density of 0.36 g/ml and a size distribution of more than 95% of particles having 150μ to 210μ and 1.6% of fine particles having less than 105μ and an average size of 182μ.

On the other hand, a polymerization solvent soluble polymer recovered from the polymerization solution was 1.1 g and a ratio of a polymerization solvent insoluble polymer to total polymer was 98.8% and an extraction residue percent of the insoluble polymer in boiled n-heptane was 95.2%.

A polymer productivity of the catalyst was 237.8 Kg/g Ti hr.

EXAMPLE 14

(c) Preparation of Solid catalytic component (A)

In a glass reactor dried and purged with nitrogen, 9.3 g of the reaction mixture obtained by Example 1-b) was charged and 75 ml of n-hexane and 15 g of ethyl benzoate were charged and stirred to suspend for 30 minutes and then, 259 g of TiCl$_4$ was added and the reaction was carried out for 2 hours under refluxing. After the reaction, the solid component was precipitated and 150 ml of supernatant was separated and 173 g of TiCl$_4$ was added and the reaction was carried out for 2 hours under refluxing. After the reaction, the solid phase was separated and washed for 4 times with 500 ml of n-hexane by each decantation-filtration and dried at 50° C. under a reduced pressure to obtain 8.7 g of a solid catalytic component (A), which contained 25.2 mg (0.526 m mole) of Ti component and 90.9 mg (0.605 m mole) of ethyl benzoate.

(d) Polymerization

In accordance with the process of Example 1 except using 0.3 m mole of triethylaluminum, 0.07 m mole of ethyl benzoate and 15.9 mg (0.00835 m mole as Ti) of the solid catalytic component (A) obtained in c), (Ratio of organoaluminum to Ti of 36; Ratio of organic acid ester to organoaluminum of 0.27), a polymerization was carried out to obtain 69.4 g of white powdery polypropylene which had a bulk density of 0.36 g/ml and a size distribution of more than 95% of particles having 150μ to 210μ and 1.6% of fine particles having less than 105μ and an average particles of 180μ.

On the other hand, a polymerization solvent soluble polymer recovered from the polymerization solution was 0.7 g and a ratio of a polymerization solvent insoluble polymer to total polymer was 99.0% and an extraction residue percent of the insoluble polymer in boiled n-heptane was 95.9%.

A polymer productivity of the catalyst was 175.3 Kg/g Ti hr.

EXAMPLE 15

(d) Polymerization

In accordance with the process of Example 14-d) except using the solid catalytic component (A) obtained by Example 14-c) and using 0.07 m mole of methyl p-toluate (Ratio of organoaluminum to Ti of 36; Ratio of organic acid ester to organoaluminum of 0.27), a polymerization of propylene was carried out to obtain 71.6 g of white powdery polypropylene which had a bulk density of 0.37 g/ml and a size distribution of more than 95% of particles having 150μ to 250μ and 1.5% of fine particles having less than 105μ and an average size of 195μ.

On the other hand, a polymerization solution soluble polymer recovered from a polymerization solvent was 0.6 g and a ratio of a polymerization solvent insoluble polymer to total polymer was 99.2% and an extraction residue percent of the insoluble polymer in boiled n-heptane was 96.6%.

A polymer productivity of the catalyst was 180.6 Kg/g Ti hr.

A melt index of the insoluble polymer (measured by ASTM-D 1238 at 230° C. under a load of 2.16 Kg referred to as MI$_2$) was 0.07 g/10 min.

EXAMPLE 16

(d) Polymerization

In accordance with the process of Example 15-d) except using 15.9 mg of solid catalytic component (A) obtained by Example 14-c), 0.3 m mole of triethylaluminum and 0.07 m mole of methyl p-toluate, and adding 0.1 Kg/cm$^2$ of hydrogen in the polymerization system, (Ratio of organoaluminum to Ti of 36; Ratio of organic acid ester to organoaluminum of 0.27) a polymerization of propylene was carried out to obtain 69.4 g of white powdery polypropylene which had a bulk density of 0.37 g/ml, a size distribution of more than 95% of particles having 150μ to 250μ and 1.9% of fine particles of less than 105μ and an averge size of 186μ.

On the other hand, a polymerization solvent soluble polymer recovered from the polymerization solution was 1.0 and a ratio of the polymerization solvent insoluble polymer to total polymer was 98.6% and an extraction residue percent of the insoluble polymer in boiled n-heptane was 95.8%.

A polymer productivity of the catalyst was 176.0 Kg/g Ti hr.

Incidentally, $MI_2$ of the insoluble polymer was 1.35 g/10 min.

In comparison with the result of Example 15, the catalytic activity and the ratio of isotactic polymer to total polymer were enough high.

EXAMPLE 17

(d) Preparation of Solid catalytic component

In accordance with the process of Example 5-c), except using 5.3 g of methyl benzoate instead of ethyl benzoate, the reaction was carried out to obtain 4.1 g of a solid catalytic component (A) which contained 20.3 mg (0.434 m mole) of Ti component and 117.4 mg (0.862 m mole) of methyl benzoate.

(d) Polymerization

In accordance with the process of Example 1 except using 0.3 m mole of triethylaluminum, 0.04 m mole of ethyl benzoate and 19.7 mg (0.00835 m mole as Ti) of the solid catalytic component (A), (Ratio of organoaluminum to Ti of 36.0; Ratio of organic acid ester to organoaluminum of 0.19), a polymerization of propylene was carried out to obtain 56.0 g of white powdery polypropylene which had a bulk density of 0.35 g/ml and a size distribution of more than 95% of particles having 150$\mu$ to 250$\mu$ and 2.3% of fine particles having less than 105$\mu$ and an average diameter of 190$\mu$.

On the other hand, a polymerization solvent soluble polymer recovered from the solvent solution was 1.6 g and a ratio of polymerization solvent insoluble polymer to total polymer was 97.2% and an extraction residue percent of the insoluble polymer in boiled n-heptane was 93.6%.

A polymer productivity of the catalyst was 144.1 Kg/g Ti hr.

EXAMPLE 18

(b) Preparation of Reaction product (b)

Into 200 ml of toluene, 12.5 g of the reaction product (a) obtained by Example 5-(a) was dissolved and 17 g of $CH_3SiCl_3$ was added dropwise at 60° to 70° C. for 2 hours. After the addition, the reaction was carried out at the same temperature for 2 hours. After the reaction, the product was washed with n-hexane as Example 1-(b) to obtain 6.1 g of a white reaction product (b).

(c) Preparation of Solid catalytic component (A)

In accordance with the process of Example 1-(c) except suspending 5.5 g of the reaction product (a) in 50 ml of n-hexane, the reaction was carried out to obtain 44 g of the solid catalytic component (A) which contained 16.8 mg (0.351 m mole) of Ti component and 122.0 mg (0.812 m mole) of ethyl benzoate per 1 g.

(d) Polymerization

In accordance with the process of Example 1 except using 0.3 m mole of triethylaluminum, 0.04 m mole of ethyl benzoate and 23.8 mg (0.00835 m mole as Ti) of the solid catalytic component, (Ratio of organoaluminum to Ti of 36; Ratio of organic acid ester to organoaluminum of 0.20), a polymerization of propylene was carried out to obtain 46.4 g of white powdery polypropylene which had a bulk density of 0.33 g/ml.

On the other hand, a polymerization solvent soluble polymer recovered from the polymerization solution was 0.5 g and a ratio of a polymerization solvent insoluble polymer to total polymer was 98.9% and an extraction residue percent of the insoluble polymer in boiled n-heptane was 95.0%.

A polymer productivity of the catalyst was 117.2 Kg/g Ti hr.

EXAMPLE 19

(b) Preparation of Reaction product

Into 100 ml of toluene, 6.3 g of the reaction product (a) obtained by Example 1-(a) was dissolved and 50 ml of a solution of 4.3 g of diethylaluminum monochloride in toluene was added dropwise at 20° to 30° C. for 1 hour and the reaction was carried out at the same temperature for 2 hours. After the reaction, the treatment was carried out to obtain 3.5 g of white reaction product (b).

(c) Preparation of Solid catalytic component (A)

In 50 ml of n-hexane, 30 g of the reaction product (b) was suspended and 3.0 g of ethyl benzoate was added and the mixture was stirred at room temperature for 30 minutes and 173 g of $TiCl_4$ was added and the reaction was carried for 2 hours under refluxing. After the reaction, the solid phase was separated and washed for 5 times with 300 ml of n-hexane by each decantation-filtration and dried under a reduced pressure to obtain 2.7 g of a solid catalytic component (A) which contained 18.1 mg (0.378 m mole) of Ti component and 108.0 mg (0.719 m mole) of ethyl benzoate per 1 g.

(d) Polymerization

In accordance with the process of Example 1 except using 0.3 m mole of triethylaluminum, 0.04 m mole of methyl p-toluate and 22.1 mg (0.00835 m mole as Ti) of the solid catalytic component (A), (Ratio of organoaluminum to Ti of 36; Ratio of organic acid ester to organoaluminum of 0.19), a polymerization of propylene was carried ot obtain 54.9 g of white powdery polypropylene having a bulk density of 0.28 g/ml.

On the other hand, a polymerization solvent soluble polymer recovered from the polymerization solution was 1.1 g and a ratio of a polymerization solvent insoluble polymer to total polymer was 98.0% and an extraction percent of the insoluble polymer in boiled n-heptane, was 94.7%.

A polymer productivity of the catalyst was 140.0 Kg/g Tihr.

EXAMPLE 20

(c) Preparation of Solid catalytic component (A)

In a glass reactor dried and purged with nitrogen, 3.4 g of the reaction product (b) obtained by Example 1-(b) was charged and then, 50 ml of n-hexane and 3.45 g of ethyl benzoate were added and the reaction product (b) was suspended for 30 minutes with stirring.

Into the reaction mixture, 84,4 g of $Ti(O-n-C_4H_9)Cl_3$ was added and the reaction was carried out for 2 hours under refluxing. After the reaction, the solid phase was separated and washed for 5 times with 300 ml of n-hexane by each decantation-filtration and dried at 50° C. under a reduced pressure to obtain 3.1 g of a solid catalytic component (A).

Into 30 ml of n-hexane, 2.5 g of the solid catalytic component was suspended and 104 g of $TiCl_4$ was added and a reaction was carried out for 1 hour under refluxing. After the reaction, the solid phase was separated and washed for 5 times with 200 ml of n-hexane by each decantation-filtration and dried under a reduced pressure to obtain 2.2 g of a solid catalytic component (A) having 13.3 mg (0.278 m mole) of Ti component and 56.3 mg (0.375 m mole) of ethyl benzoate.

(d) Polymerization

In accordance with the process of Example 1 except using 0.3 m mole of triethylaluminum, 0.06 m mole of ethyl benzoate and 30.1 mg (0.00835 m moles as Ti) of the solid catalytic component (A) (Ratio of organoaluminum to Ti of 36; Ratio of organic acid ester to organoaluminum of 0.24), a polymerization of propylene was carried out to obtain 58.8 g of white powdery polypropylene which had a bulk density of 0.30 g/ml.

On the other hand, a polymerization solvent soluble polymer recovered from the polymerization solution was 1.4 g and a ratio of a polymerization solvent insoluble polymer to total polymer was 97.7% and an extraction residue percent of the insoluble polymer in boiled n-heptane was 96.0%.

A polymer productivity of the catalyst was 150.6 Kg/g Tihr.

What is claimed is:

1. A process for producing a powdery isotactic polyolefin having high isotactic characteristic and a narrow size distribution which comprises forming a polymerization catalyst system including a solid catalytic component (A) formed by the preparatory process consisting essentially of reacting a Grignard reagent with a chain or cyclic hydropolysiloxane having the unit formula:

$$R_a^1 H_b SiO_{\frac{4-a-b}{2}}$$

($R^1$ represents an alkyl, aryl, aralkyl, alkoxy or aryloxy group; a is o, 1 or 2; b is 1, 2 or 3 and $a+b \leq 3$), to form a reaction product (a); reacting the reaction product (a) dissolved in an aromatic hydrocarbon solvent with at least one compound having the formula:

$$R^2_n M^{(z)} X_{z-n}$$

($R^2$ represents a $C_1$ to $C_{12}$ hydrocarbon moiety; M represents Al or Si; z represents atomic value of 3 or 4; X represents a halogen atom; n is 0, 1 ... (z−1)) in the presence of the aromatic hydrocarbon solvent at a temperature lower than 85° C. to form a particulate reaction product (b); and reacting the particulate reaction product (b) with at least one titanium halide in the presence of an organic carboxylic acid ester (c) added in the preparatory process after the formation of reaction product (a) to obtain the solid catalytic component (A) and adding an organoaluminum compound (B) and then, polymerizing a $C_3$ or $C_4$ olefin in the presence of a catalytic amount of the polymerization catalyst system including component (A) and compound (B).

2. A process according to claim 1, wherein said polymerization catalyst system is prepared by combining the solid catalyst component (A) with the organoaluminum compound (B) at a molar ratio of the organoaluminum compound (B) to Ti component in the solid catalytic component (A) of 2 to 15 in the absence of added organic acid ester other than that used as component (c) in the preparation of reaction product (A).

3. A process according to claim 1, wherein an organic carboxylic acid ester (C) is incorporated in the polymerization catalyst system for combination with components (A) and (B) at a molar ratio of a total of the organic acid ester (c) remaining in the solid catalytic component (A) and a newly added organic acid ester (C), to the organoaluminum compound (B) of 0.1 to 0.4 at a molar ratio of the organoaluminum compound (B) to Ti component in the solid catalytic component (A) of 10 to 80.

4. A process according to claim 1, 2 or 3 wherein the hydropolysiloxane is methyl hydropolysiloxane.

5. A process according to claim 1, 2 or 3 wherein the Grignard reagent is an organomagnesium compound obtained by reacting an organic halide with a magnesium metal or a magnesium alloy.

6. A process according to claim 1, 2 or 3 wherein the compound having the formula $$R^2_n M^{(z)} X_{z-n}$$

is aluminum chloride or silicon tetrachloride.

7. A process according to claim 1, 2 or 3 wherein the organic hydrocarbon solvent is benzene, toluene or xylene.

8. A process according to claim 1, 2 or 3 wherein an amount of the compound having the formula $$R^2_n M^{(z)} X_{z-n}$$

is in a range of 0.1 to 10 mole per 1 mole of Mg component in the reaction product (a).

9. A process according to claim 1, 2 or 3 wherein the titanium halide is titanium tetrachloride.

10. A process according to claim 1, 2 or 3 wherein the organic acid ester (c) is an aromatic monocarboxylic acid ester.

11. A process according to claim 1, 2 or 3 wherein the organoaluminum is trialkyl aluminum or dialkylaluminum halide.

12. A process according to claim 3 wherein the organic acid ester (C) is an aromatic monocarboxylic acid ester.

13. A process according to claim 1 wherein the solid catalytic component (A) is treated with titanium tetrachloride before combining it with the organoaluminum compound (B).

14. A process according to claim 1, 2 or 3 wherein said olefin is propylene to obtain isotactic polypropylene.

15. A process for producing a powdery isotactic polyolefin having high isotactic characteristic and a narrow size distribution which comprises forming a polymerization catalyst system including a solid catalyst component (A) formed by the preparatory process consisting essentially of reacting (i) a Grignard reagent with (ii) a liquid chain or cyclic hydropolysiloxane having the unit formula:

$$R_a^1 H_b SiO_{\frac{4-a-b}{2}}$$

($R^1$ represents an alkyl, aryl, aralkyl, alkoxy or aryloxy group; a is 0, 1 or 2; b is 1, 2 or 3 and $a+b \leq 3$), in a ratio of 0.05 to 1 mols of (i) expressed as Mg in the Grignard reagent to 1 mol of (ii) expressed as Si to form a reaction product (a); reacting the reaction product (a) dissolved in an aromatic hydrocarbon solvent with at least one compound having the formula:

$$R^2{}_n M^{(z)} X_{z-n}$$

(R² represents a C₁ to C₁₂ hydrocarbon moiety; M represents Al or Si; z represents atomic value of 3 or 4; X represents a halogen atom; n is 0, 1 ... (z−1)) at a molar ratio of 0.1 to 10:1 of the said compound to Mg in the reaction product (a) in the presence of the aromatic hydrocarbon solvent at a temperature in the range of 20° C. to 85° C. to form a particulate reaction product (b); and reacting the particulate reaction product (b) at 50° to 150° C. with at least one titanium halide in the presence of an aromatic organic carboxylic acid ester (c) added in the preparatory process after formation of the reaction product (a), at a molar ratio of 0.5 to 5 of (c) to 1 mol of Mg in the reaction product (b) and 0.1 to 150 mole of titanium halide per 1 mol of Mg in the reaction product (b), to obtain the solid catalytic component (A) containing 0.5 to 10 wt.% of Ti and a molar ratio of organic ester (c) to Ti of 0.6 to 4.0:1 and adding an organoaluminum compound (B) and then, polymerizing a C₃ or C₄ olefin in the presence of a catalytic amount of the polymerization catalyst system including component (A) and compound (B).

16. The process of claim 14 wherein the Grignard reagent is butyl magnesium chloride, the hydropolysiloxane is a methylhydropolysiloxane, the aromatic hydrocarbon solvent is benzene, toluene, or xylene, the compound $R^2{}_n M^{(z)} X_{z-n}$ is aluminum chloride or silicon tetrachloride, the titanium halide is titanium tetrachloride, and the organic carboxylic acid ester (c) is an aromatic monocarboxylic acid ester selected from methyl benzoate, ethyl benzoate, methyl toluate, ethyl toluate, methyl anisate and ethyl anisate.

* * * * *